Sept. 20, 1955  V. J. EVRAETS  2,718,361
FILM REEL MOUNTING AND DRIVE FOR
MOTION PICTURE PROJECTORS
Filed July 27, 1953  2 Sheets-Sheet 2
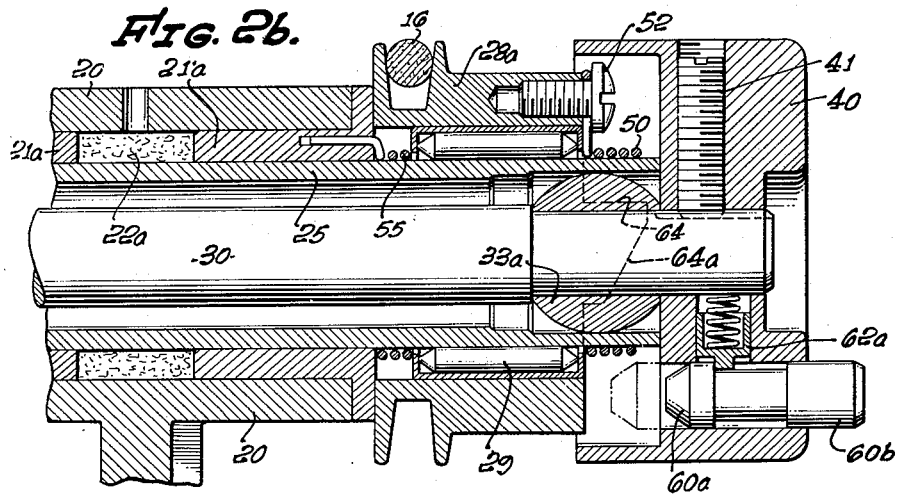
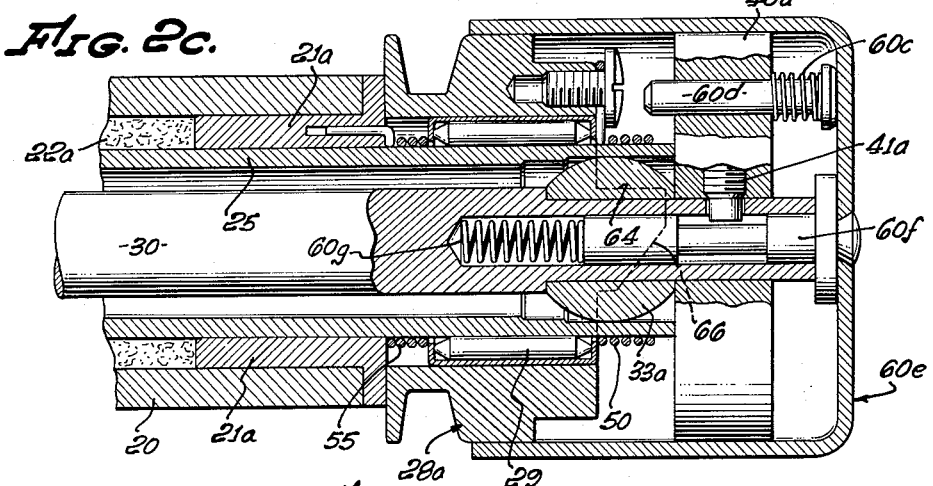
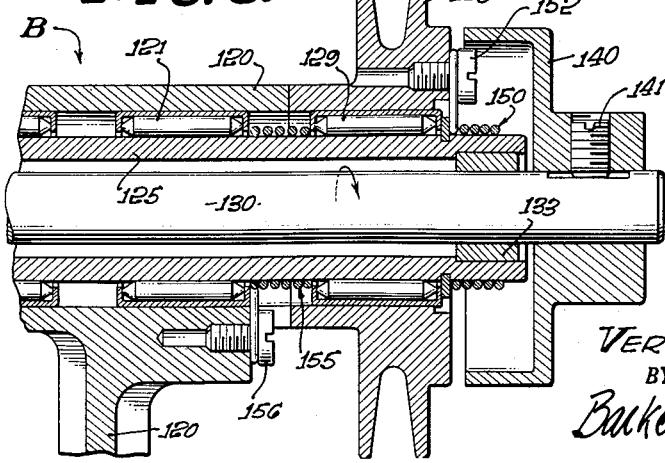
INVENTOR.
VERNON J. EVRAETS,
BY
Backelew & Cantlebury
ATTORNEYS

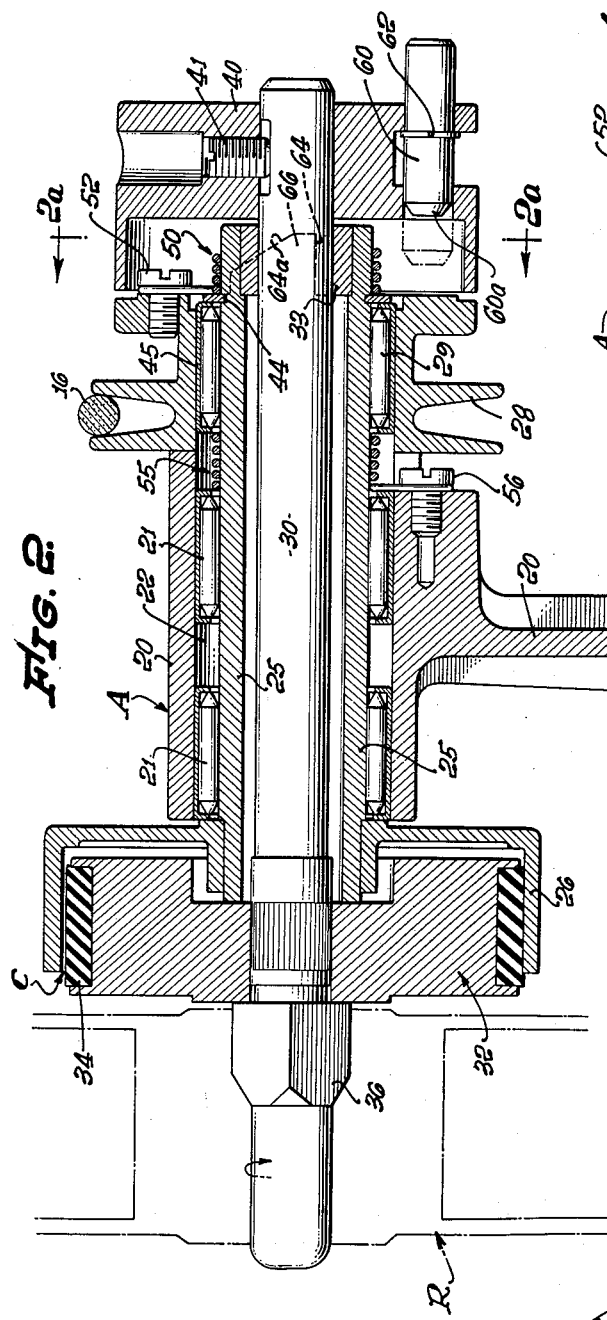

United States Patent Office 2,718,361
Patented Sept. 20, 1955

2,718,361

FILM REEL MOUNTING AND DRIVE FOR MOTION PICTURE PROJECTORS

Vernon J. Evraets, Glendale, Calif., assignor to Mitchell Camera Corporation, Glendale, Calif., a corporation of Delaware Application July 27, 1953, Serial No. 370,321

7 Claims. (Cl. 242—55)

This invention has reference to the mounting and driving of film reels in motion picture projectors; a general object of the invention being to provide a dependable and long wearing reel mechanism which in very simple form provides for maintaining nearly constant tension on the film, automatically provides for reverse movement of a film through the projector in response to reversal of drive direction and provides a simple and positive rewind drive without the necessity of switching reels. While reel operating devices have before provided for constant or substantially constant tension, or for automatic reverse movement or positive rewind, none to my knowledge has provided for all three of those features in a simple and easily operated automatic mechanism. How my present invention makes those provisions in simple form will be best understood from consideration of the illustrative embodiments of the invention described in the following and shown in the accompanying drawings in which:

Fig. 1 is a diagrammatic view showing the relation of supply reel mechanism and take-up reel mechanism to a projector;

Fig. 2 is a longitudinal sectional view, taken as indicated by line 2—2 on Fig. 1, showing supply reel mechanism embodying an illustrative form of the invention;

Fig. 2a is a cross-section on line 2a—2a of Fig. 2;

Figs. 2b and 2c are fragmentary longitudinal sections showing modifications; and Fig. 3 is a longitudinal section taken as indicated by line 3—3 on Fig. 1 showing an illustrative form of the invention as used for the take-up reel.

Fig. 1 shows in purely diagrammatic form the relation of the reel drives to a projector 10. A reel driving shaft 12 is driven, in any suitable or usual driving arrangement, by the projector driving motor or mechanism which also drives the intermittent film moving mechanism of the projector in timed relation to shaft 12. Whether by motor reversal, or by reversing gearing, the film movement and shaft 12 can be driven together in timed relation in either direction. Fig. 1 shows a belt drive 14 from drive shaft 12 to the take-up reel mechanism B with pulley ratios preferably designed to drive the take-up reel (through the slippage hereafter described) only at the speed necessary to take-up film on the smallest reel core used; and shows a belt drive 16 to the supply reel mechanism A with pulley ratios preferably designed to drive the supply reel mechanism at a considerably higher speed for fast rewind. Although the initial drives to the two mechanisms are shown, and will be described, as involving pulleys and belts, any other form of known positive drive can be used because the belt drives are not used for slippage but purely for positive initial driving of the initial drive members of the two mechanisms.

It will be assumed for simplicity of description that both the reel driving mechanisms rotate in clockwise directions viewed from the reel carrying ends of their shafts (from the left in Figs. 2 and 3) (or counter-clockwise viewed from the driving ends of their shafts as in Fig. 1) when the film is being normally projected and is being run from the supply reel on mechanism A to the take-up reel on mechanism B. During reverse film projection, or during rewinding when the film is freed from the projector movement and runs directly from the reel at B to that at A, the rotative directions of the film driving mechanisms are then counter-clockwise as viewed from the left in Figs. 2 and 3. Throughout this description the directions of rotation, unless stated otherwise, will be based on the above stated descriptive convention of rotative direction, as viewed from the reel ends.

Referring first to the illustrative form of supply reel mechanism A, shown in Fig. 2, the supporting frame is shown at 20, provided with bearings 21 arranged with a lubricant space 22 between them. Sleeve 25 is journaled in those bearings and carries friction drive cup 26 rigidly mounted on its left hand end, the sleeve and friction drive cup constituting a rotative unit. Drive pulley 28 is journaled by means of roller bearing 29 on the opposite end of sleeve 25 and is driven continuously and effectively positively from the projection machine by belt 16. The direction of pulley drive is clockwise (viewed from the left in Fig. 2) during normal projector operation, and counter-clockwise during reverse operation of the projector and for rewinding. Pulley 28 is in all cases driven at the same relatively fast speed, which speed is adequate for rewinding.

Within sleeve 25 is the reel shaft 30, carrying friction drive drum 32 fixed near its left hand end, and having its right hand end centered in the sleeve by means of a bushing 33 which acts as journal for the shaft in the sleeve. Bushing 33 allows shaft 30 to swing about a point centered in the bushing through the very small angle (say 1° or so) that may result from wear of the friction lining 34. To allow that angular movement it is only necessary, and has been found fully practicable, to make the bushing fit the shaft 30, or fit in sleeve 25, loosely, or, as shown in Figs. 2b and 2c, the bushing 33 may be externally spherical. The extreme left hand end of shaft 30 is formed at 36 for releasably carrying the film reel in rotatively locked relation to the shaft. Such a reel is indicated in broken lines at R. Between journal bushing 33 and friction drive drum 32 there is radial clearance between shaft 30 and sleeve 25. The drum carries a friction lining 34 which nearly fills the space within cup 26, but leaves a slight clearance as indicated at C. The lining, preferably of felt, is cemented into place on the drum, and its outer surface is then ground accurately to size. The inner surface of the cup 26 is also accurately finished; and between the two finished surfaces the clearance C is preferably quite small. Subject to that small clearance, the drum, lining and cup therefore serve to center the left hand end of shaft 30 in sleeve 25. The frictional pressure with which the lining on drum 32 presses at its lower side on the inner periphery of cup 26 is determined by the effective weight of parts 30, 32, 34 (a fixed factor) and by the weight of the reel and film coiled on the reel (a factor which varies as a function of the radius of the film coiled on the reel and the size of the reel used). The film tension due to the frictional drag between the cup and drum is determined by the effective total weight and by the radius of the film coil. How the film tension is kept satisfactorily uniform is explained later. The outer surface of the friction lining 34 and the inner surface of the drive cup 26 are here shown as preferably cylindric, but they may be conical.

A collar 40 is rigidly mounted on the right hand end of shaft 30 by means of set screw 41. Collar 40 and drum 32, both fixed on shaft 30, define the axial position of the shaft with respect to the unit comprising sleeve 25 and drum 26. Pulley 28 is axially positioned between thrust bearing surfaces provided by the end of frame member 20 and by a retaining ring 44 set in a groove in sleeve 25 and serving to confine the outer race 45 of the bearing 29 which outer race is forced-fitted into the hub of pulley 28. Those same thrust bearing surfaces, and the thrust bearing surface of cup 26 against 20 (or against a bearing race fixed in 20) fix the axial position of the sleeve and cup unit with relation to 20.

An overrunning clutch 50 is provided between pulley 28 and sleeve 25. As illustrated, that clutch is in the form of a coil spring enclosing the sleeve and having one end fixed to the pulley by screw 52. That clutch transmits counter-clockwise rotation of pulley 28 to sleeve 25, but permits the pulley 28 to rotate freely in a clockwise direction with respect to the sleeve.

A second overrunning clutch comprises a coil spring 55 enclosing sleeve 25 and having one end fixed with relation to frame 20 by screw 56. That clutch permits sleeve 25 to rotate counter-clockwise with respect to the frame, to drive the reel in its reverse, or film winding, direction, but restrains 25 from rotating in a clockwise direction. This prevents the friction of the bearing 29 and of clutch 50 from driving the reel clockwise during normal projection, in which case the film would be unreeled faster than projected and would unwind onto the floor. The cup 26 is stationary during normal projection.

For the operation of rewinding the film, shaft 30 is positively connected to driving pulley 28, to be positively driven in counter-clockwise direction at the relatively high speed of that pulley. As will appear, whenever the drive of the two reel mechanisms is reversed to feed film from the normal take-up reel at B to the normal supply reel at A, the reel at B is subject to its frictional drag at 34. Consequently, to maintain a high speed of rewind, it is desirable that the film reel at A be driven by a torque greater than the drag torque on the reel at B; preferably be positively driven. A preferred simple arrangement for effecting that positive drive is shown in Figs. 2 and 2a.

A clutch pin 60 is slidably mounted in collar 40 for movement parallel to shaft 30. It is held in place by a small spring collar 62 which allows a limited movement of the pin between the retracted position shown in full lines in Fig. 2, and a position shown in broken lines where the left hand end of the pin is pushed in to the position shown. The extreme end of the pin is preferably conically bevelled at 60a; but in the pushed-in position its straight cylindric part is far enough projected to engage flatly with the square end surface 64 of a lug or lugs 66 which project axially from drive pulley 28. When pulley 28 is being driven in its rewinding direction (counter-clockwise) opposite to the direction indicated by the arrows, the square driving face 64 engages pin 60 to positively drive it and shaft 30 and reel R counter-clockwise at the full speed of pulley 28. Friction accompanying the pressure of 64 on 60 prevents the pin from working out and away from its driven engagement with 64. However, as soon as the direction of reel drive is reversed to the normal clockwise direction, then camming face 64a on the lug or lugs 66 will immediately engage the beveled end of the pin to push it out. And the same automatic pushout will take place if pin 60 should mistakenly be pushed in while pulley 28 is being driven in its normal clockwise direction. That action makes it impossible to lock pulley 28 by endeavoring to drive sleeve 25 clockwise against the holding action of clutch 55.

Certain modifications are shown in Figs. 2b and 2c. In both these modifications the parts at the left hand end are the same as in Fig. 2 and are therefore not shown. The bearings in frame part 20 are shown as plain bushings 21a with an oil wick or packing 22a between them, and pulley 28a bears in end thrust against the flanged end of a bushing 21a. And instead of the journal bushing 33 shown in Fig. 2, Figs. 2b and 2c show a spheric journal element 33a which fits in sleeve 25 to form a spheric universal bearing or joint, and in which the shaft 30 is journaled. The journal bushing 33 of Fig. 2 is merely a simpler form of such a means for journaling shaft 30 in sleeve 25 for rotation about the shaft axis and for universal swinging of the shaft about a point (in Figs. 2b and 2c centered on 33a) on that axis.

Further modifications in Figs. 2b and 2c have to do with the rewind driving clutch. In Fig. 2b the clutch pin 60b is the same in function as for pin 60 in Fig. 2. It is however held in place by a small spring pressed keeper 62a whose pressure on 60b provides additional friction tending to prevent the clutch pin from moving out of its inserted driving position until it is positively forced out by the camming action of lug face 64a.

In Fig. 2c a collar 40a is secured to shaft 30 by set screw 41a. Pin 60d is slidably mounted in collar 40a and pressed outwardly by a light spring 60c. In its inner position (that shown in the figure) its inner end engages lug or lugs 66 in the same manners and with the same functionings as does the pin 60 of Fig. 2. When pin 60d is drivingly engaged by square driving face 64 the friction developed between 64 and 60d may be sufficient to prevent spring 60c from moving the pin out; but when the driving pressure ceases pin 60d can be moved out by the spring if it is not being held in by the manual operating cap 60e. On the other hand, spring 60c may be made strong enough to move pin 60d out while the pin is frictionally engaged by 64. In that case it is necessary to hold the manual operating cap in throughout the rewinding operation. That cap, fitted to slide longitudinally over collar 40a and also over a part of pulley 28a, and also to be rotatable relative to 40a, 28a and shaft 30, is mounted on and guided by a sliding plunger 60f mounted in a bore in the end of shaft 30 and pressed out by a spring 60g. The normal outer position of the cap is to the right of that shown in Fig. 2c, its outer position being limited by the projecting end of set screw 41a. In that outer position it allows the clutch pin 60d to move out to a position where it will not engage a lug 66. When it is desired to set the fast rewind in operation, cap 60e is pressed in while pulley 28 is being driven in the rewind direction. As soon as pin 60d is engaged by 64, cap 60e may be released and is moved out by its spring 60g. That leaves pin 60d free to be moved out by its spring 60c as soon as rewind driving ceases. Or, as indicated above, the cap may be held in throughout the rewinding operation. As in Figs. 2 and 2b, the camming face 64a will prevent pin 60d being drivingly engaged when rotation is in the normal clockwise direction; and will move the pin out in case spring 60c does not do so.

All of these positive drive arrangements act directly between drive pulley 28 and shaft 30. However they might as well act between sleeve 25 and shaft 30 as, on rewinding rotation, the sleeve is being positively driven at full speed through overrunning clutch 50 from the pulley. Such an arrangement would constitute, as well as those described, a manually operable means for connecting the shaft to the drive pulley for positive rotation in the rewind direction.

The driving mechanism B for the take-up reel, partially shown in Fig. 3, is similar to that for the supply reel shown in Fig. 2 except that the take-up mechanism has had no positive rewind driving clutch arrangement. (Modifications of the take-up reel drive may be like the modifications of the supply reel drive shown in Figs. 2b and 2c without the positive rewind drive clutches there shown.) Fig. 3 shows only the parts corresponding to the parts in the right hand end of Fig. 2, as those at the left in the figure are the same for both reels. In Fig. 3 similar or corresponding parts are given the same numerals as in Fig. 2 increased by one hundred. As mentioned before, the take-up is driven at lower speed than the supply; consequently take-up drive pulley 128 may be larger than pulley 28 and is so shown in Fig. 3, and, since it has been assumed that the take-up reel shaft 130 rotates clockwise to wind film, the clutch 150 is wound so as to transmit clockwise rotation from pulley 128 to sleeve 125; and the clutch 155 allows clockwise rotation with reference to the machine frame, and prevents counter-clockwise rotation. To generalize, it may be remarked that in each of the reel driving mechanisms A and B, the clutch 50 or 150 drives sleeve 25 or 125, and the drive cup, from the drive pulley in the direction in which film is wound on the corresponding reel, and clutch 55 or 155 prevents rotation of the sleeve and drive cup with reference to the machine frame in the opposite direction. And, in the supply mechanism A the positive clutch acting between the drive pulley and the reel shaft acts to drive only in the same direction as the first mentioned clutch—in a film winding direction.

In normal operation of the machine, film is positively drawn by the projector movement at a uniform rate from the reel R on mechanism A and is fed positively at the same rate from the movement to the reel R on mechanism B, on which it is wound. The positive rewind clutch 60 of mechanism A is at that time of course disengaged from pulley 28 (full line position in Fig. 2). At take-up mechanism B pulley 128 is driven by belt 14 from the machine at a rate preferably just more than sufficient to take up the film when the film roll on the reel has its minimum size. Pulley 128 drives sleeve 125 and its drive cup positively clockwise at that speed via overrunning clutch 150. The drive drum is frictionally driven from the cup, rotating always at a speed slower than that of the cup. The difference in speed, and hence the degree of slip, increases gradually as the film is wound on the take-up reel and as the effective diameter of the reel increases. Because of that increasing diameter, tension applied to the film by the take-up reel tends progressively to decrease if a constant torque is applied to the reel. However, since the friction between the friction lining and cup varies with the weight of film on reel B, the transmitted torque increases with the effective reel diameter, tending to maintain a uniform film tension as explained later. During such normal operation, overrunning clutch 155 is inoperative, permitting sleeve 125 and the friction cup to be freely driven clockwise from pulley 128.

Meanwhile at supply reel mechanism A, which is being rotated clockwise by the tension of the withdrawn film, sleeve 25 and cup 26 are prevented from rotating with the reel by the action of overrunning clutch 55. Therefore rotation of the reel is braked by the friction of lining 34 on the stationary cup, and that friction varies with the weight of film on reel A. As described later, the arrangements are such that the film tension between supply reel A and the projector mechanism tends to be maintained constant in spite of the gradually decreasing effective reel diameter.

During the operation just described pulley 28 is driven clockwise at a relatively high speed, but does not in any way affect the reel action since it is effectively disconnected from sleeve 25 by overrunning clutch 50.

When the projection machine is operated in reverse with film projection, for example to produce a comedy effect or to permit repetition of a short sequence without un-threading the film, both pulleys are driven counter-clockwise. At mechanism A, then acting to drive its reel as take-up, overrunning clutch 50 grips sleeve 25, driving it and the drive cup 26 counter-clockwise at the relatively high speed of pulley 28. A counter-clockwise torque is applied through friction lining 34 to reel A, which therefore acts as a takeup reel, applying approximately uniform tension to the film. Overrunning clutch 55 permits free counter-clockwise rotation of sleeve 25, relative to the frame.

Meanwhile at mechanism B pulley 128, driven counter-clockwise, is effectively disconnected from sleeve 125 by overrunning clutch 150. Clutch 155 prevents that sleeve and its friction cup from rotating counter-clockwise, and the friction action therefore applies to the reel on mechanism B (now the supply reel) a braking effect which exerts a substantially constant film tension.

The action of the two reel drives is entirely symmetrical with respect to forward and reverse motion of the film through the projector, with the single distinction that pulley 28 is always driven relatively much faster than pulley 128. That, however, does not appreciably affect the torque transmitted by the friction clutch, but merely results in appreciably more slippage during the driven phase of the reel at A than of the reel at B. Since the projector is only occasionally driven in reverse, that additional slippage causes no trouble.

To re-wind the film it is disengaged from the projector mechanism proper and extends directly between reel at A and reel at B. The projector motor is reversed, driving pulleys 28 and 128 counter-clockwise at the same respective speeds as for reverse operation of the projector. Positive clutch pin 60 (60b or 60d) is engaged with pulley 28 by pressing the pin to the left into the position illustrated. Pulley 28 thereupon drives reel A directly through pin 60 and collar 40, fixed on the reel shaft. Since that drive is positive, it operates at the full pulley speed, giving a relatively fast re-wind, and exerts sufficient tension on the film to withdraw it from reel B in spite of the frictional drag applied to that reel. That frictional drag is the same, and is produced by the same mechanism, during re-winding as during reverse operation of the projector. Namely, sleeve 125 and its friction drum are held stationary by overrunning clutch 155, while pulley 128 is effectively freed from the sleeve by overrunning clutch 150.

It has been stated that the effective frictional pressure of the friction lining 34 on cup 26 (and therefore the torque transmitted between the cup and reel shaft 30) is determined directly by the varying total effective weight at the frictional surfaces. That total effective weight is made up of two factors. The first factor, which is unvarying during any given operation, is made up of the fixed weight of the reel shaft and the drum, and the weight of the reel which, although unvarying in any given operation is changeable with different sized reels. The second factor of the total effective weight is due to the varying weight of film on the reel.

The film tension due to any given torque applied to the reel shaft is T/R, where R is the radius of the film coil and T the torque. The torque due to the first, unvarying, weight factor is constant during any given operation, and the film tension due to that first factor therefore varies inversely with the radius R. The torque due to the second, varying, weight factor varies directly with the weight of the film, which, in turn, varies directly with the square of R. The film tension due to the second factor therefore varies directly with the first power of R.

It has been found that if the total unvarying weight factor (shaft, drum and reel) is chosen to be in certain proportion to the total maximum weight of both the weight factors (including the maximum film weight) then the film tensions at R minimum and R maximum will be approximately equal, and the tension at intermediate values of R will be somewhat but not unacceptably lower. That proportion is found to be approximately the ratio of R minimum to R maximum. For instance, if as in a reel for two thousand feet of 16 mm. film, the ratio of the radius of the reel core to the maximum radius of the film coil is approximately ⅓, then the unvarying weight factor (including the reel weight) should be about one third the maximum weight of both the unvarying and varying factors. It happens that the standard two-thousand foot reel, which weighs about twenty-nine ounces empty, provides in itself nearly enough weight to satisfy the above ratios.

However, when for instance a much smaller four-hundred foot reel is being used, although its core radius is smaller, its weight is so small that additional fixed weight, to the extent of about five to ten ounces, is necessary to bring the film tension at R minimum approximately up to that attained with the largest reel. Consequently, in accordance with the invention, approximately that amount of fixed effective weight is supplied in the reel shaft and drum. That weight is provided, in the present embodiments, by making friction drum 32 solid, as shown in Fig. 2, and of somewhat greater axial length than would otherwise be necessary. That amount of fixed weight greatly improves performance with the smaller reels, but when added to the weight of the largest reel does not materially change its operation from what has been stated above, the film tensions at R minimum and R maximum remaining about equal.

It may be remarked that the amount of fixed effective weight supplied by the reel shaft and drum depends not only on the weight of those parts but also on the location of the journal 33 or 33a; that is, its axial spacing from drum 32. In the drawings that journal is shown in a position near the right hand end of the shaft, but it of course can be located in sleeve 25 in any selected axial spacing from drum 32.

The film tensions being thus maintained acceptably constant for different sized reels and varying film weights, the absolute values of the film tension, preferably between a maximum of five ounces and a minimum of two ounces for 16 mm. film, are fixed by the diameter of the friction drive drum and the frictional coefficient of the friction faces. With standard reel sizes and weights, and with the fixed weight as indicated above, a friction drive drum of about 1¾ inch diameter and frictional surfaces of hard compacted felt against finished steel, have been found to give about the desired film tension over the entire range of operating conditions.

I claim:

1. In combination with a projector mechanism and supply and take-up film reels therefor, a reel driving and braking mechanism for each reel, each said mechanism embodying a rotative drive member, power transmission means driving the two drive members selectively in forward or reverse rotative directions in correspondence with operation of the projector mechanism in forward or reverse direction, said transmission means including transmission members of such ratios as to drive the drive member of the supply reel mechanism at a higher rotative speed than the drive member of the take-up reel mechanism, frictional means driving the take-up reel from its drive member in a forward direction to take up film and applying frictional retardation to rotation of the take-up reel in a reverse direction, frictional means retarding rotation of the supply reel in a forward direction in which the reel pays out film, and a manually operable positive clutch mechanism through which the supply reel may be positively driven in a reverse direction from its drive member, said clutch mechanism being effective for driving only in the reverse direction.

2. The combination defined in claim 1 and including also frictional means for driving the supply reel in a reverse direction.

3. The combination defined in claim 2, and in which the manually operable clutch mechanism is provided with means positively throwing it out of operation when the supply reel drive member is being driven in the forward direction.

4. The combination defined in claim 1, and in which the manually operable clutch mechanism is provided with means positively throwing it out of operation when the supply reel drive member is being driven in the forward direction.

5. Reel driving and braking mechanism for the supply reel of a projector, comprising in combination a primary rotatable friction driving and braking member, means effective for driving said member in film take-up direction only, means for holding said member against rotation in the other direction, a reel carrying shaft, a secondary friction drive and brake member on the shaft and frictionally engaging the primary member, said driving means for the primary member including an initial drive element rotatable about the axis of the reel carrying shaft in either the film take-up direction or the opposite direction, and a manually controllable clutch acting between the initial drive element and the reel carrying shaft to positively drive the shaft in the film take-up direction only, said clutch comprising a driving lug carried on the initial drive element and having a drive shoulder facing in the direction of take-up rotation and a camming face facing angularly in the opposite rotational direction and axially of the shaft axis, and a lug engaging member carried by the shaft in fixed rotational reltion thereto but movable axially of the shaft to engage and disengage the driving lug.

6. The combination defined in claim 5 and including also a collar fixedly mounted on the shaft, and the lug engaging member being a pin axially slidable through said collar.

7. The combination defined in claim 6 and including also a cap mounted on the shaft for axial movement thereon, the rim of the cap surrounding said collar and the cap base engageable with the pin to move it into lug engaging position.

References Cited in the file of this patent

UNITED STATES PATENTS

| | | |
|---|---|---|
| 1,843,650 | Schlicker | Feb. 2, 1932 |
| 2,217,183 | Ross | Oct. 8, 1940 |
| 2,280,727 | Stechbart | Apr. 21, 1942 |
| 2,325,885 | Serrurier | Aug. 3, 1943 |
| 2,343,961 | Del Valle | Mar. 14, 1944 |
| 2,531,558 | Debrie | Nov. 28, 1950 |

FOREIGN PATENTS

| | | |
|---|---|---|
| 989,760 | France | May 30, 1951 |